No. 709,484. Patented Sept. 23, 1902.
J. O. HEINZE, Jr.
MAGNETIC WHEEL.
(Application filed Feb. 24, 1902.)
(No Model.) 3 Sheets—Sheet I.
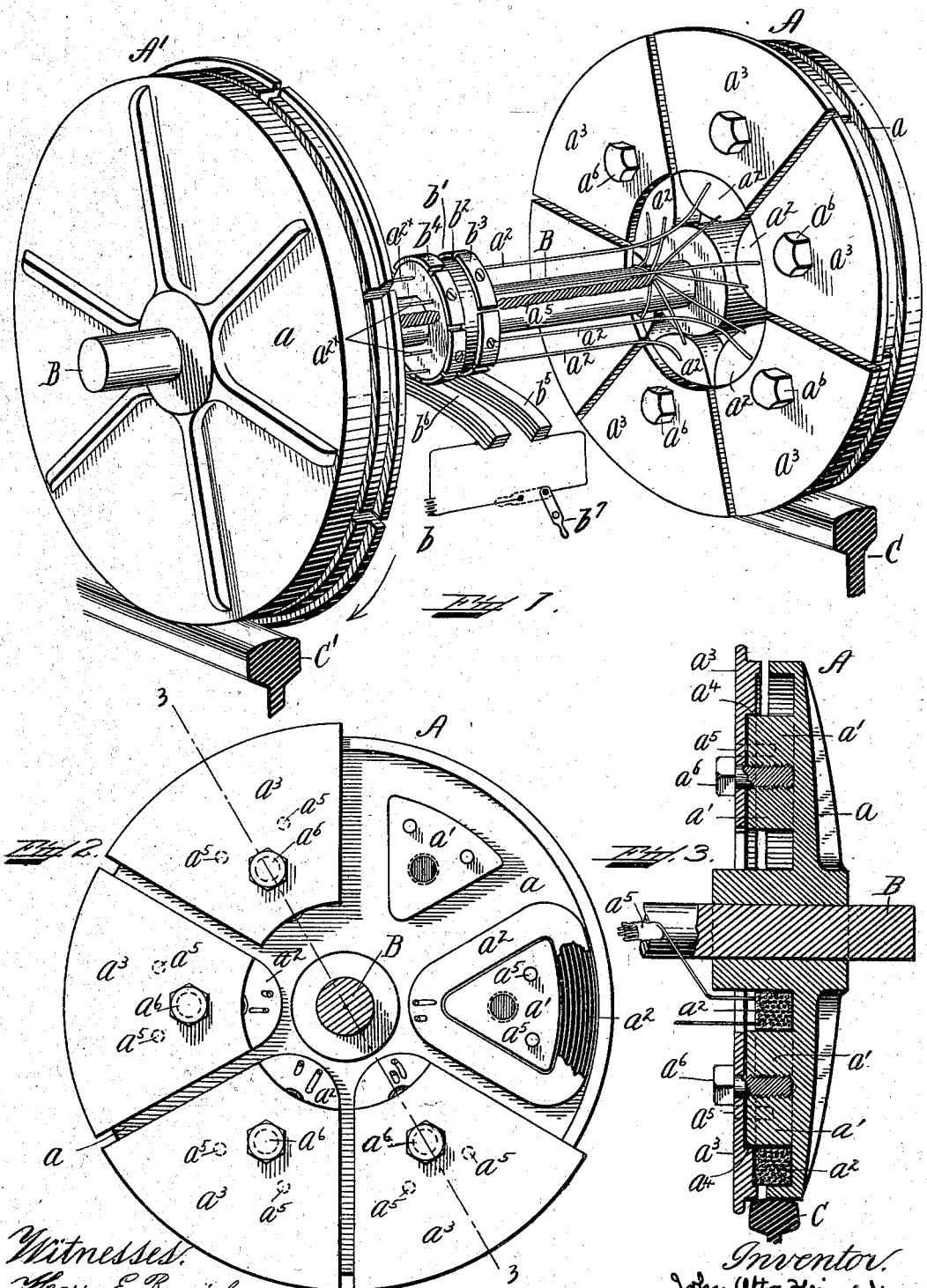

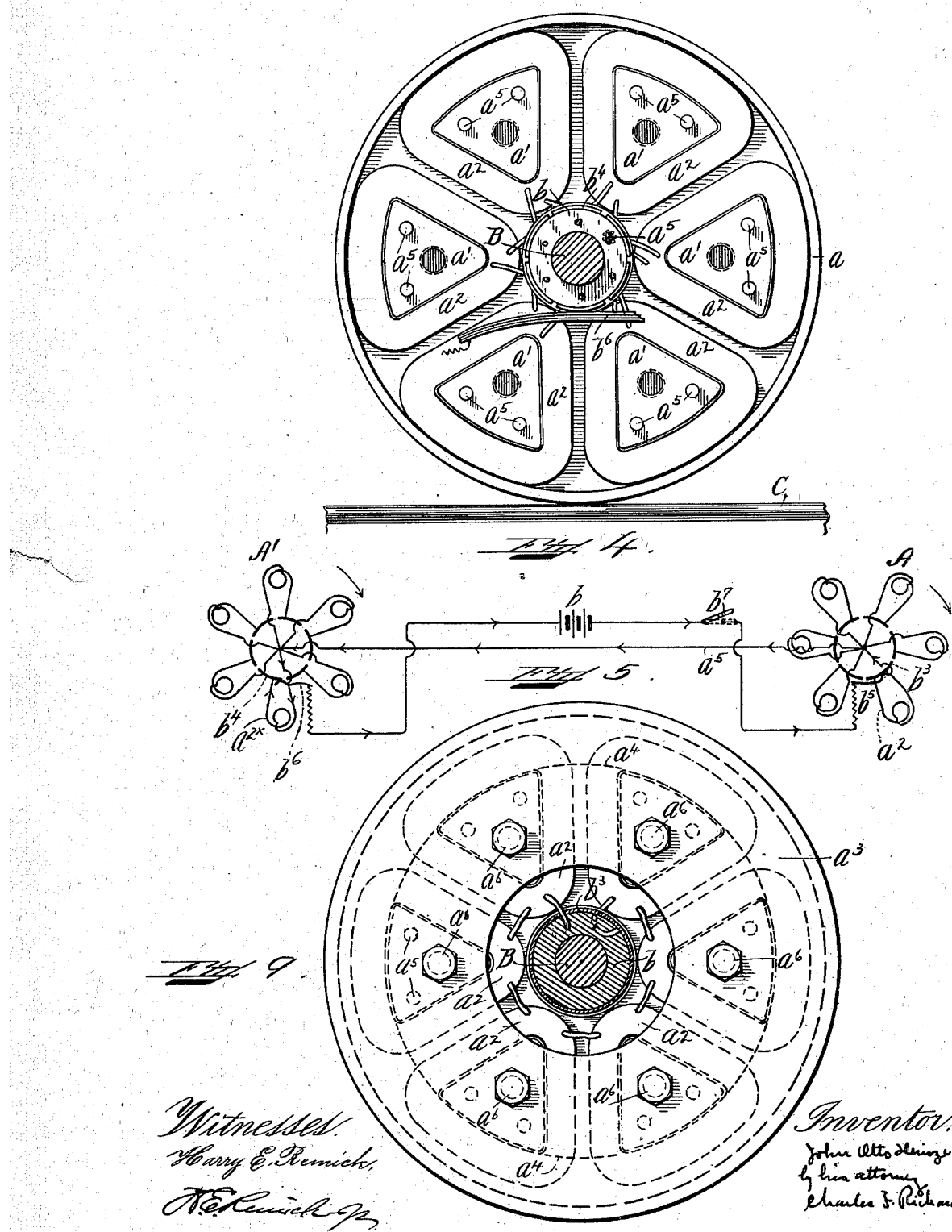

No. 709,484. Patented Sept. 23, 1902.
J. O. HEINZE, Jr.
MAGNETIC WHEEL.
(Application filed Feb. 24, 1902.)

(No Model.) 3 Sheets—Sheet 3.

Witnesses.
Harry E. Remick.
H. E. Remick Jr.

Inventor.
John Otto Heinze Jr.
by his attorney
Charles F. Richardson

UNITED STATES PATENT OFFICE.

JOHN OTTO HEINZE, JR., OF REVERE, MASSACHUSETTS.

MAGNETIC WHEEL.

SPECIFICATION forming part of Letters Patent No. 709,484, dated September 23, 1902.

Application filed February 24, 1902. Serial No. 95,169. (No model.)

*To all whom it may concern:*

Be it known that I, JOHN OTTO HEINZE, Jr., a citizen of the United States, residing at Revere, in the county of Suffolk and State of Massachusetts, have invented certain new and useful Improvements in Magnetic Wheels, of which the following is a specification.

Figure 6:
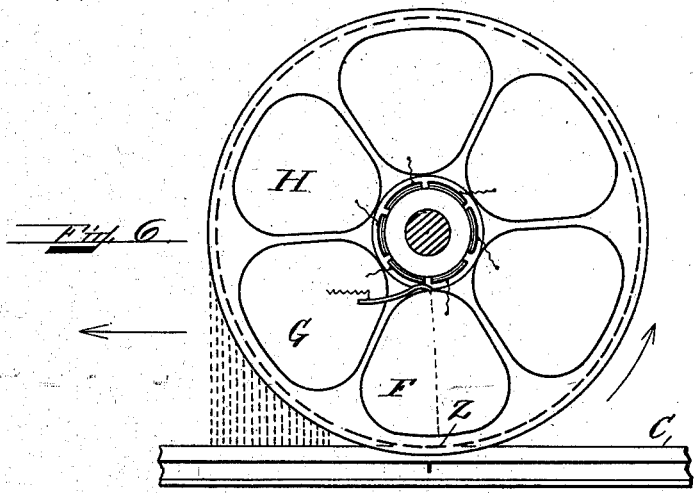
Figure 7:
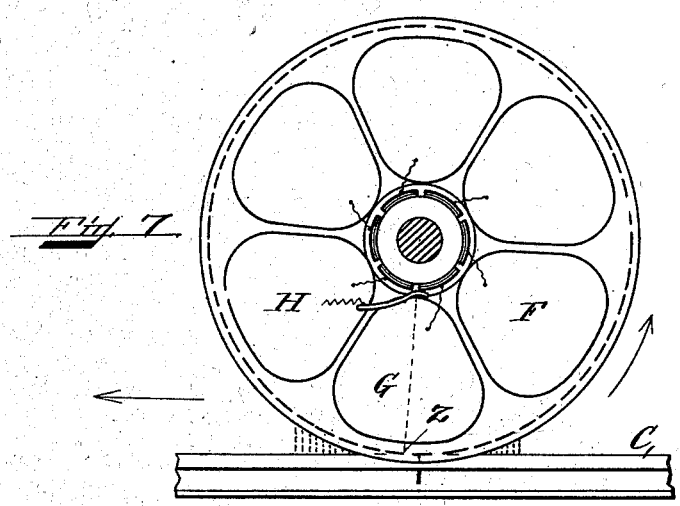
Figure 8:
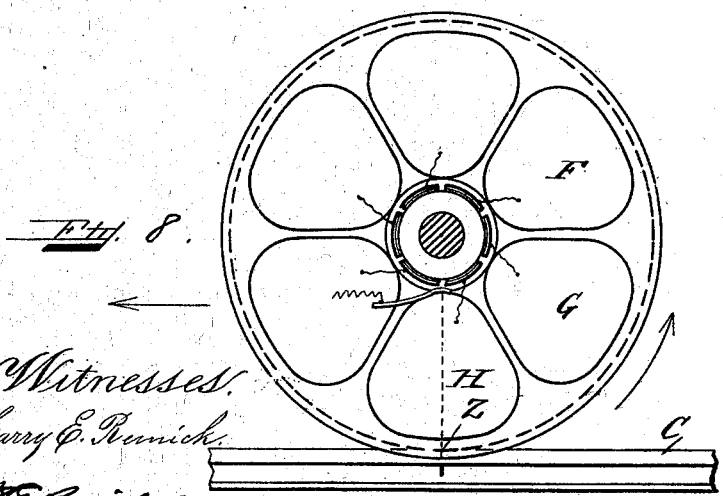

Figure 1 is a perspective view of my invention embodied in two railway-wheels and rails with which they are in contact, the structure supported by the wheels and axle being omitted for the sake of clearness. Fig. 2 is an elevation of one of said wheels, two of its sector-plates having been removed to show the yokes of two of its electromagnets and one electric coil mounted on one of said yokes. Fig. 3 is a cross-section on line 3 3 of Fig. 2, one coil having been removed. Fig. 4 is an elevation of one of said wheels, all of its sector-plates having been removed to show the disposition of the electric coils relatively to the hub of the wheel and one of the peripheries thereof and the commutator. Fig. 5 is a diagrammatic view of the electric wiring, brushes, commutator, and source of electric energy and shows how portions of the adjacent peripheries of each wheel may become an electromagnet. Figs. 6, 7, and 8 are diagrammatic views illustrating the operation of my invention, and Fig. 9 is an end view of a modification, the separate sector-plates shown in the preferred form of wheel being made in one ring-shaped piece and the electric coils being arranged in series.

My invention relates to an improved form of magnetic wheel; and the object of my invention is so to design a magnetic wheel that it will have the greatest magnetic efficiency by establishing therein the shortest magnetic current, the least magnetic leakage, and the greatest concentration of magnetism where the magnetic field is to be used, all of which may be accomplished with the least expenditure of electrical energy. Further, by its construction the magnetic lag is reduced to a minimum, and the strength of the wheel and the facility with which the parts of the wheel may be assembled are greatly increased.

A wheel embodying my invention may be made self-propelling, as will later appear. To accomplish these objects, I so design said wheel that it consists of two or more independent magnetic circuits or electromagnets, both poles of each and every electromagnet or magnetic circuit being at the periphery of said wheel.

In the drawings illustrating the principle of my invention and the best mode now known to me of applying that principle, A A' are railway-wheels fixed to an axle B in any well-known manner, as by shrinking, keying, or the like, and C C' are rails with which said wheels are in contact. The wheel A is of magnetic material and is made up of a ribbed circular plate $a$, from the inner face of which project two or more yokes $a'$, (see Figs. 2 and 3,) that are cast therewith. Copper wire $a^2$, covered with suitable wrapping, is coiled about each yoke $a'$, the terminals of said wire being connected with a commutator $b'$, later to be described. A sector-like plate $a^3$, concentric with the main plate $a$ and having the same diameter as main plate $a$, is mounted on each of said yokes $a'$. The inner face of each plate is cut away to engage a shoulder $a^4$, formed by the upper portion of yoke $a'$. (See Fig. 3.) It has two holes that receive pins $a^5$ in the yoke $a'$ and is held in close contact with yoke $a'$ by bolt $a^6$ or any other suitable means. The sector plate, yoke, and main plate by this construction virtually become one solid piece and a magnetic section, yet it permits any one or more of the coils $a^2$ to be quickly assembled or removed whenever occasion may require. (See Figs. 2, 3, and 4.) The sector-plates $a^3$ are magnetically insulated from each other, as by air-spaces or by filling said spaces with any suitable non-magnetic material, the peripheries of the sector-plates and the main plate forming the tread of the complete wheel. The wheel A' is similar to the construction of wheel A, just described.

The electric current required to magnetize each of the magnetic sections or electromagnets of each wheel can be supplied from any suitable source of electrical energy, as battery $b$. Mounted on the axle B is the commutator $b'$. It consists of a circular disk $b^2$, of insulating material, and has fixed thereto a number of metallic segments $b^3 b^4$, each pair composing the terminals of an electric circuit, said electric circuit being composed of a wire which is wound into a coil $a^2$ about one yoke $a$ in each wheel A A'. That portion of each wire leading from one coil in wheel A is wound into a cable $a^5$ and carried through the commutator $b$ to the other wheel A', where each wire, as $a^2$, is separated from the cable $a^5$ and passed about its respective yoke $a'$ in the wheel A'. These wires then return and are secured to said metallic pieces $b^4$, as above described. $b^5 b^6$ are two commutator-brushes, $b^5$ being in contact with series $b^3$ and $b^6$ being in contact with series $b^4$. To make and break the circuit between the battery $b$ and the commutator $b'$, a switch $b^7$ is provided. Each pair of commutator-pieces $b^3 b^4$ and the brushes $b^5 b^6$ are so located that when one of the electromagnets, as $a^{2\times}$, of wheel A' is in the position shown in Fig. 5 the brush $b^6$ is just about to be slipped off the commutator-piece $b^4$, connected with the coil of the electromagnet, the brush $b^5$ and its commutator-piece for wheel A are still in engagement. At least one of the electromagnets is thus always in a position to be magnetized and be in a magnetic field.

The operation of my invention is as follows, reference being had especially to Figs. 1 and 5: The switch $b^7$ is closed, as is shown in dotted lines, and the electric current, flowing, as indicated by the arrows, from its source of supply-battery $b$, passes through the brush $b^5$, commutator $b$, the wire $a^2$, around the yoke $a'$, thereby powerfully magnetizing the pole sector-plate $a^3$ and the main plate $a$ of wheel A, which are in contact with the rail C, through the cable $a^5$ to the coil $a^{2\times}$, and then through the end portion thereof to commutator-piece $b^4$, then through brush $b^6$ to battery $b$. These plates $a^3$ $a$ are of opposite polarity, and the magnetism immediately passes from the main plate $a$ to the keeper or rail C, to the sector-plate $a^3$, thus completing the magnetic circuit.

From the above description of the construction and operation of my invention it will be plain that in the case of a wheel and its rail, for example, the magnetism flows from one pole-plate of said wheel to said rail transversely to its length and then to the other pole or plate of said wheel and is highly concentrated at the point of contact between said wheel and its rail, and thus a short and massive magnetic circuit is established in said wheel and its rail, and a high efficiency of adhesion between said wheel and its rail results.

Referring to Figs. 6, 7, and 8, it will be noted that the commutator and brushes are so disposed that after the center of the pole-piece of each magnet, as F, (shown at $z$ in Fig. 6,) has come into contact with its rail or keeper and has passed by it then the electric circuit is broken, and the magnet G, which is adjacent to magnet F and is approaching said rail, is immediately magnetized by the electric current passing around its yoke, and a magnetic field (indicated by dotted lines) is established between its poles and the rail, the strength thereof increasing while the poles approach the rail. The resultant magnetic attraction (see Fig. 7) is always ahead of the point of contact between the rail and the tread of the wheel until the magnetic attraction at the rear of the point of contact equals that ahead of it, as shown in Fig. 8; but at this moment the electric circuit is broken by commutator, and the current passes around the yoke of the next magnet, as H, and a magnetic field is established between the poles and the rail, the strength thereof likewise increasing as the poles approach the rail until the magnetic attraction before and behind the point of contact is equal, at which time the current is cut off. The operation just described continues to be repeated with each succeeding magnetic section or electromagnet.

It will now be plain that by my invention the poles of each electromagnet may be demagnetized at or before resultant magnetic current passes to the rear of the point of contact, that the magnetic lag is thus avoided, and that the magnetic attraction between the wheels and the rail necessarily tends to move the wheel along the track, as is indicated in Figs. 6, 7, and 8. Where the wheels are staggered, as in Figs. 1 and 5, it will be plain that the tendency to move the wheels along the track is constant.

In Fig. 9 I have shown a modified form of wheel, in which a solid ring is substituted for the sector-like plates. This form has the advantage of strength, but the disadvantage that some of the magnetism, which, if the ring were sector-like plates, would pass through the armature of each magnet, escapes. This figure also shows the coils about the yokes of the magnets connected in series. By this construction the entire circumference of the wheel is magnetized and has as many magnetic circuits as there are sections in the wheel all at the same time; but it tends greatly to reduce the magnetic lag that would be present if the wheel constituted one electromagnet.

It will also be evident to all those skilled in the art to which my invention appertains that by varying the relative positions of the commutator and its brushes any one or more magnetic sections of one or more wheels may be magnetized at one time or successively to create one or more magnetic fields when and where needed. Further, the magnetic surface with which a wheel embodying my invention may be in contact need not necessarily be a plane surface, such as a rail. It may be, for instance, a metallic rope, partially or wholly encircling the tread of the wheel. I wish it to be clearly understood that in the construction of my invention I do not limit myself to the use of any particular magnetic material or to the construction shown in the drawings and that I claim my invention in the broadest manner legally possible.

What I claim is—

1. As an article of manufacture, a wheel; two or more yokes projecting from the side thereof; a ring-plate made of magnetizable sections, concentric with said wheel, the circumference of said plate forming a portion of the tread of the complete wheel; and means for securing said ring-plate to said yokes; said wheel, yokes, and ring, being of magnetic material, and designed to permit free access to said yokes.

2. As an article of manufacture, a wheel; two or more yokes projecting from the side thereof; a ring-plate made of magnetizable sections, concentric with said wheel and having its circumference form a portion of the tread of the complete wheel, the inner face of said plate being cut away to engage shoulders formed on the yokes; and means to secure said plate to said yoke; said wheel, yokes and plate, being of magnetic material; all designed to give great strength to the complete wheel, and free access to said yokes and coils.

3. As an article of manufacture, a wheel; two or more yokes projecting from the side thereof; sector-like plates, whose arcs are concentric with said wheel and form portions of the tread of the complete wheel; and means to secure said sector-like plates to said yokes; said wheel, yokes, and plates, being of magnetic material; all designed to give free access to said yokes and coils.

4. As an article of manufacture, a wheel; two or more yokes projecting from the side thereof; sector-like plates whose arcs are concentric with said wheel, and form portions of the tread of the complete wheel; the inner face of each plate being cut away to engage a shoulder formed on the yokes, thereby increasing the strength of the complete wheel; coils of wire wound about said yokes; and means to secure said plates to said yokes; said wheels, yokes and plates being of magnetic material.

5. As an article of manufacture, a wheel; two or more yokes projecting from the side thereof; a ring-plate made up of magnetizable sections, concentric with said wheel, the circumference of said plate forming a portion of the tread of the complete wheel; means for securing said ring-plate to said yokes; insulated wire wound about each of said yokes; said wheel, yokes, and ring-plate being of magnetic material, and designed to permit free access to said yokes and coils.

6. As an article of manufacture, a wheel; two or more yokes projecting from the side thereof; a ring-plate made up of magnetizable sections, concentric with said wheel and having its circumference form a portion of the tread of the complete wheel, the inner face of said plate being cut away to engage shoulders formed on the yokes; means to secure said plate to said yokes; said wheel, yokes and plate being of magnetic material; and insulated wire wound about each of said yokes; all designed to give great strength to the complete wheel; and free access to said yokes and coils.

7. As an article of manufacture, a wheel; two or more yokes projecting from the side thereof; sector-like plates whose arcs are concentric with said wheel and form portions of the tread of the complete wheel; means to secure said sector-like plates to said yokes; said wheel, yokes, and plates, being of magnetic material; insulated wire wound about said yokes; all designed to give free access to said yokes and coils.

8. As an article of manufacture, a wheel; two or more yokes projecting from the side thereof; sector-like plates whose arcs are concentric with said wheel, and form portions of the tread of the complete wheel; the inner face of each plate being cut away to engage shoulders formed on the yokes, thereby increasing the strength of the complete wheel; coils of wire wound about said yokes; and means to secure said plates to said yokes; said wheels, yokes, and plates, being of magnetic material.

9. In a vehicle, the combination of an axle, and two wheels mounted thereon, each wheel having two or more yokes projecting from the side thereof; a ring-plate made up of magnetizable sections, concentric with said wheel, the circumference of said plate forming a portion of the tread of the complete wheel; means for securing said ring-plate to said yokes; insulated wire wound about each of said yokes; each of said wheels, yokes and rings being of magnetic material, and designed to permit free access to said yokes and coils.

10. In a vehicle, the combination of an axle and two wheels mounted thereon, each wheel having two or more yokes projecting from the side thereof; a ring-plate made up of magnetizable sections concentric with said wheel and having its circumference form a portion of the tread of the complete wheel, the inner face of said plate being cut away to engage shoulders formed on the yokes; means to secure said plate to said yokes; said wheels, yokes and plates being of magnetizable material; and insulated wire wound about each of said yokes; all designed to give great strength to the complete wheels and free access to said yokes and coils.

11. In a vehicle, the combination of an axle and two wheels mounted thereon, each wheel having two or more yokes projecting from the side thereof; sector-like plates whose arcs are concentric with said wheel and form portions of the tread of the complete wheel; means to secure said sector-like plates to said yokes; said wheel, yokes, and plates, being of magnetic material; an insulated wire wound about said yokes; all designed to give free access to said yokes and coils.

12. In a vehicle the combination of an axle and two wheels mounted thereon, each wheel having two or more yokes projecting from the side thereof; sector-like plates whose arcs are concentric with said wheel, and form portions of the tread of the complete wheel; the inner face of each plate being cut away to engage a shoulder formed on said yokes, thereby increasing the strength of the complete wheel; coils wound about said yokes; and means to secure said plates to said yokes; said wheels, yokes and plates being of magnetic material.

13. In a vehicle, the combination of an axle and two wheels mounted thereon, each wheel having two or more yokes projecting from the side thereof; a ring-plate made up of magnetizable sections, concentric with said wheel, the circumference of said plate forming a portion of the tread of the complete wheel; means for securing said ring-plate to said yokes; insulated wire wound about each of said yokes; each of said wheels, yokes and rings being of magnetic material, and designed to permit free access to said yokes and coils; and means whereby an electric current may be caused to pass around one or more of said yokes.

14. In a vehicle, the combination of an axle and two wheels mounted thereon, each wheel having two or more yokes projecting from the side thereof; a ring-plate made up of magnetizable sections concentric with said wheel and having its circumference form a portion of the tread of the complete wheel, the inner face of said plate being cut away to engage shoulders formed on the yokes; means to secure said plate to said yokes; said wheels, yokes and plates being of magnetizable material; and insulated wire wound about each of said yokes; all designed to give great strength to the complete wheels and free access to said yokes and coils; and means whereby an electric current may be caused to pass around one or more of said yokes.

In testimony whereof I affix my signature in presence of two witnesses.

JOHN OTTO HEINZE, JR.

Witnesses:
JOHN W. SAXE,
WILLIAM ODLIN.